United States Patent
Horgan, Jr.

[15] 3,653,156
[45] Apr. 4, 1972

[54] GLASS DOORS

[72] Inventor: William J. Horgan, Jr., Pittsburgh, Pa.
[73] Assignee: Blumcraft of Pittsburgh, Pittsburgh, Pa.
[22] Filed: Feb. 21, 1968
[21] Appl. No.: 707,055

[52] U.S. Cl. ............................................. 49/501, 52/627
[51] Int. Cl. ............................................. E06b 3/00
[58] Field of Search .................... 49/381, 388, 396, 400, 489,
49/501; 52/624, 627

[56] References Cited

UNITED STATES PATENTS

| | | | |
|---|---|---|---|
| 2,667,244 | 1/1954 | West | 52/627 |
| 3,098,698 | 7/1963 | Glynn | 49/501 X |
| 3,284,976 | 11/1966 | Kadish | 49/489 X |

*Primary Examiner*—Kenneth Downey
*Attorney*—Paul & Paul

[57] ABSTRACT

A door made of glass and metal channel members.

In one embodiment, the channel members comprise a top member and a bottom member; each being shaped to receive the glass in a shallow channel.

In an alternate embodiment there are four members, i.e., two side members, a top member and a bottom member. The base of each channel of the side members is held away from the glass by spacers. The channels are adhered to the glass by adhesive. The channel members have holes therein communicating the space formed by the channel with the atmosphere to cure the adhesive.

2 Claims, 13 Drawing Figures

PATENTED APR 4 1972
3,653,156
SHEET 1 OF 3
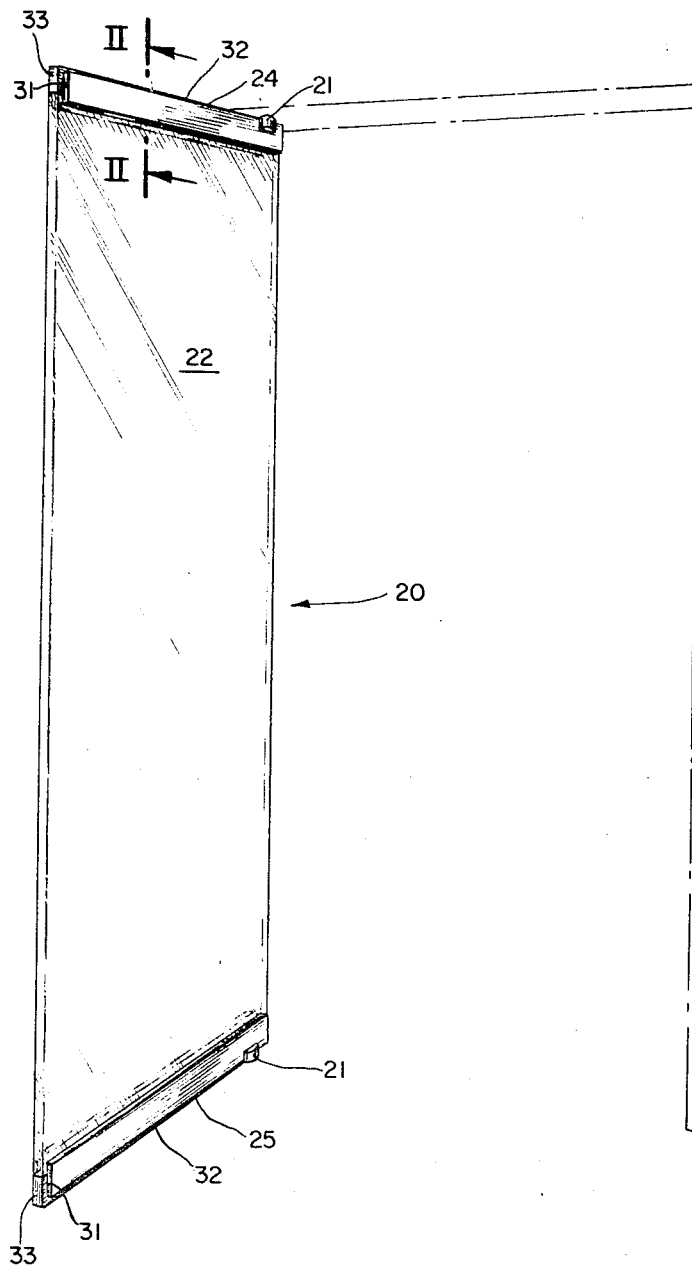
Fig. 1
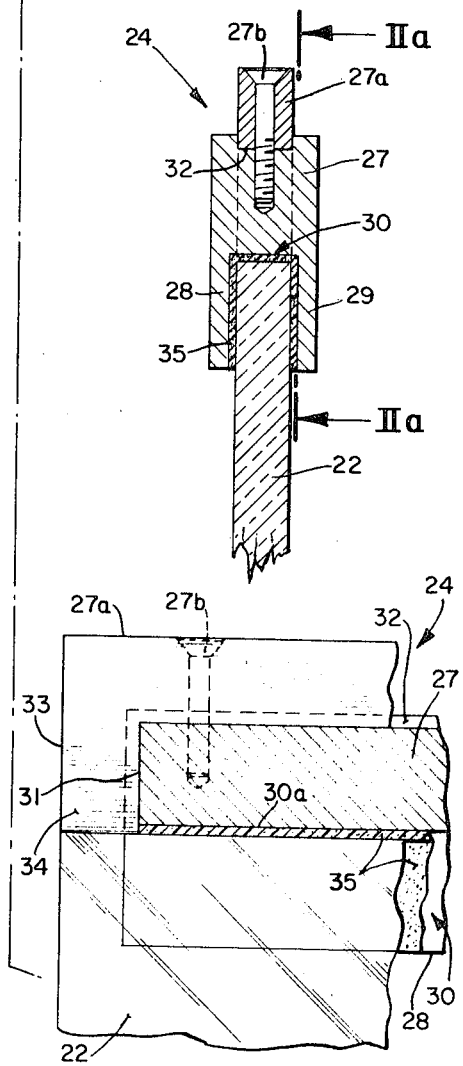
Fig. 2
Fig. 2a
INVENTOR.
William J. Horgan, Jr.
BY
Paul & Paul
ATTORNEYS.

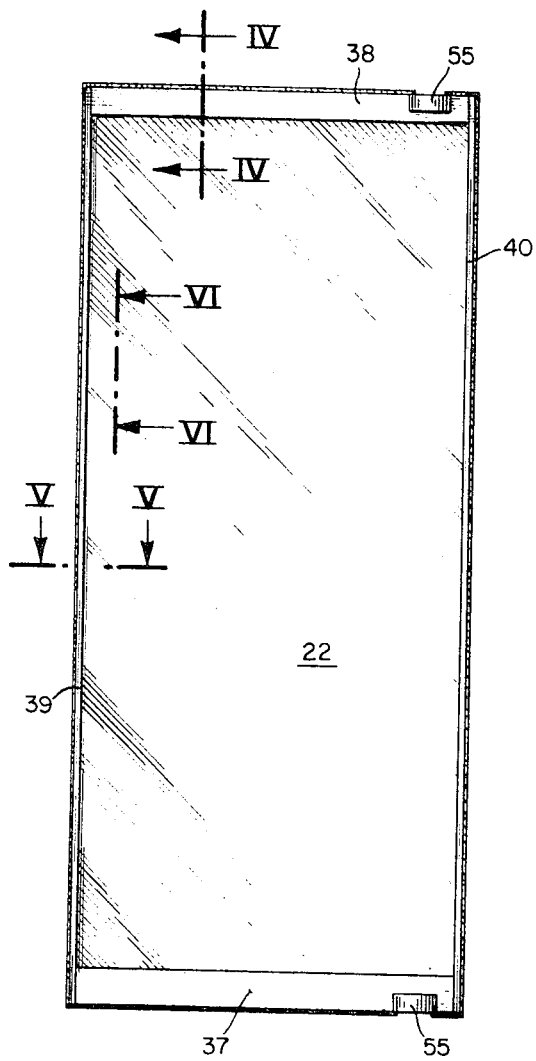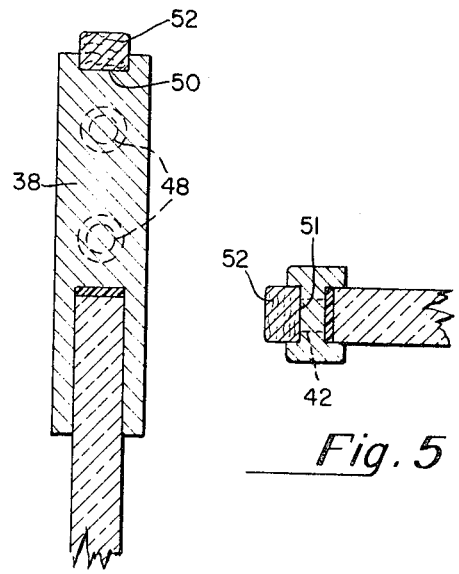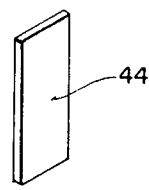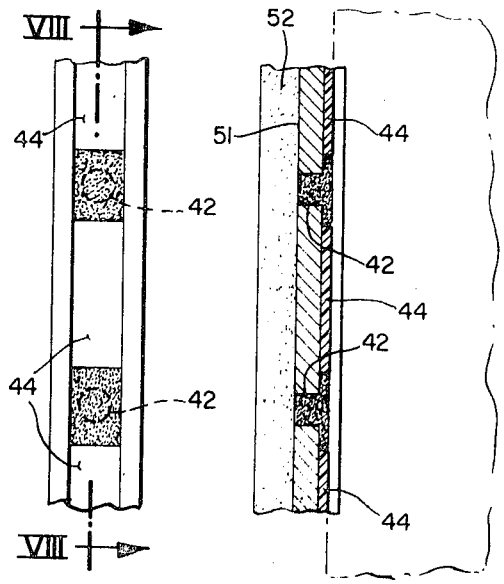

PATENTED APR 4 1972 3,653,156

INVENTOR.
William J. Horgan, Jr.

BY

*Paul + Paul*
ATTORNEYS.

GLASS DOORS

BACKGROUND OF THE INVENTION

This invention relates to glass doors for buildings—both inside and outside doors—and more particularly to a new door comprising, in combination, metal channel members and a glass panel. The advent of extensive use of glass in architectural design for buildings, and for offices within the buildings, has created a pressing need for new approaches to the use of glass and metal in doors. In particular, prior art doors have been made either of very heavy, thick, glass panels on the order of 1 inch or so in thickness, or if thinner glass was used, a heavy, bulky frame was hung in the doorway, the frame being a rather substantial structure in itself so that even without the glass in the frame, it formed a rigid structure which could be pivotally swung about the hinges. The lighter glass was then inserted into the frame for decorative purposes only.

SUMMARY OF THE INVENTION

My invention covers a new door comprising the combination of a glass panel with a plurality of metal members having channels formed therein for reception of the glass panel and being adhered to the glass panel by a variety of resilient and adhesive materials; the glass itself being a structural member of the door. Accordingly, an object of my invention is to provide a new and novel door of glass and strips of metal. Other objects of my invention will become apparent from the following description with reference to the drawings.

BRIEF DESCRIPTION OF THE DRAWINGS

FIG. 1 is a perspective view of a door in accordance with one embodiment of my invention;

FIG. 2 is a view taken as indicated by the lines and arrows II—II in FIG. 1;

FIG. 2a is a view taken ad indicated by the lines and arrows IIa—IIa in FIG. 2, partially broken away;

FIG. 3 is a front view of a door showing another embodiment of my invention;

FIG. 3 is a section taken as indicated by the lines and arrows IV—IV in FIG. 3;

FIG. 5 is a section taken as indicated by the lines and arrows V—V in FIG. 3;

FIG. 6 is a section as indicated by the lines and arrows VI—VI in FIG. 3;

FIG. 7 is a perspective view of the part designated VII in FIG. 6;

FIG. 8 is a view taken as indicated by the lines and arrows VIII—VIII in FIG. 6;

DESCRIPTION OF THE PREFERRED EMBODIMENT

Figure 9:
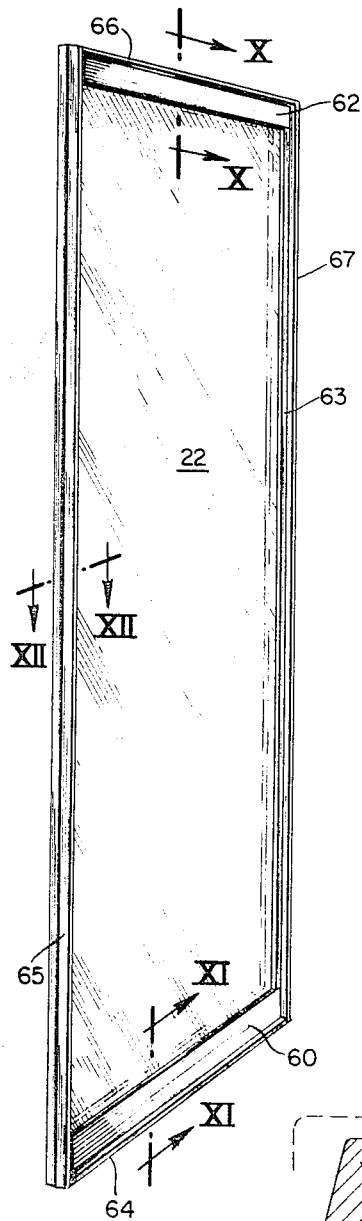
FIG. 9 is a perspective view of another door showing another embodiment of my invention.
Figure 11:
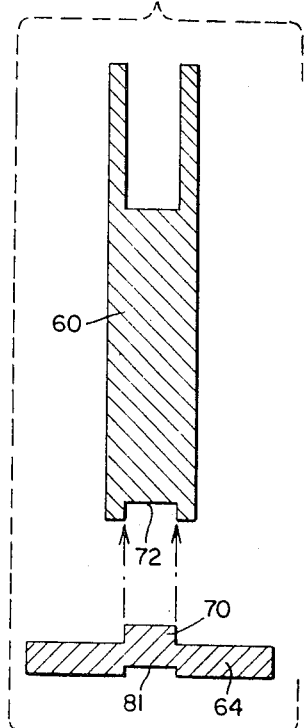
FIG. 11 is an exploded view of a section taken as indicated by the lines and arrows XI—XI in FIG. 9.
Figure 10:
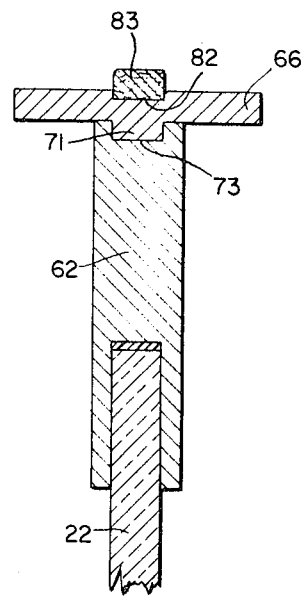
FIG. 10 is a section taken as indicated by the lines and arrows X—X in FIG. 9.

Although specific forms of the invention have been selected for illustration in the drawings, and the following description is drawn in specific terms for the purpose of describing these forms of the invention, this description is not intended to limit the scope of the invention which is defined in the appended claims.

In FIG. 1 a door 20 in accordance with one embodiment of my invention, is shown mounted for rotation about pivotal mounting means 21 (known in the art) in a doorway (shown in phantom). The door consists of a glass panel 22 which is preferably three-eighths or one-half of an inch thick to accommodate standard glass door panels. For purposes of further description herein, the glass shown will be described as three-eighths inch thick. At the top and bottom of the panel are channel members 24 and 25 which are preferably identical in construction and, as shown in cross section in FIG. 2, consist of a two part base 27, 27a and flange portions 28 and 29 defining a channel designated 30. The flange portions are on the order of one-eighth of an inch thick, and the base portion is on the order of five-eighths of an inch thick so that the channel 30 is approximately three-eighths of an inch wide, thus making a close fit with the glass 22. In the industry, it is common for three-eighths inch glass to be slightly undersized so that some space occurs between the closely held tolerances of the channel and the nominal width of the glass.

The channel is preferably one inch deep. In assembling the channel member with the glass panel, an adhesive material 35 is introduced into the channel, and the glass is then slid into the channel, forcing the material up and around the sides of the glass between the flange portions. Any excess material which is forced out of the channel, is wiped away. The material in the channel sets up hard, and adheres the glass 22 to the metal channel member 24. It is preferably in this embodiment to use a material known in the trade as "Expando-tite."

The glass panel 22 could not function as a door itself, nor could the channel members 24 and 25. However, the combination of the glass panel with the channel members adhered to it, forms an excellent unitary structure, which has been tested and proven to perform well as a door when pivoted in the manner disclosed. This is so even though the 1-inch channel is itself rather shallow.

Base portion 27 is recessed along its outer edges (as at 31 and 32 FIG. 2a). Base portion 26a of the channel members is the same thickness as the glass, and is attached to base portion 27 in the recesses in any suitable fashion as by bolts 27b. This allows the door to be flush-mounted against a door jamb. Also, the terminal end 33 of the channel members is flush with the edge of the glass panel 22. The flush end provides an excellent means of attaching weather stripping continuously, all the way around the periphery of the door.

Referring to FIG. 2a, note that the vertically oriented portion 34 of the terminal end 33 of base portion 27a extends past the bottom 30a of the channel 30, so that the glass panel 22 rests on the portion 34 at either end of the channel. This offset is preferably one-sixteenth of an inch, and provides positive contact between the base and the glass panel in the vertical direction for purposes of maintaining stability, while at the same time allowing room for the adhesive between the base and the glass.

An alternate embodiment of my invention is shown in FIGS. 3 through 8. Herein, a composite door is once again formed from a single glass panel 22 and a plurality of channel members 37, 38, 39, and 40. The channel members each consist of a base portion and flange portions which embrace the glass. Insofar as thickness dimensions are concerned, these are similar to the channel members shown in FIGS. 1 and 2 so that there is a close fit between the glass and the flanges of the channel members. However, the method of combining the channel members with the glass panel is somewhat different. Also, while the channel members at the top and bottom have a channel which is approximately 1 inch deep, the channel members 39 and 40 on the sides of the glass panel 22, have channels which are only one-eighth of an inch deep. The channel members on the sides are adhered to the glass, as shown more particularly in FIGS. 5, 6, and 8 by an adhesive such as a silicone or polysulfide adhesive. In this embodiment, the flanges of the channels receiving the glass are within close proximity of the glass, to keep the small side channel members from rocking on the glass. The silicone adhesive requires exposure to the air in order to cure, and therefore, since most of the adhesive is in the bottom of the channel, it is prevented by the close proximity of the flanges to the glass, from communicating with the air. To provide for curing, a plurality of small holes 42 on the order of one-quarter of an inch in diameter (being approximately 1½ inches center to center) are provided preferable in the base of the channel member, communicating the channel with the atmosphere. A plurality of spacers 44, preferably made of plastic and approximately one-sixteenth of an inch thick, are disposed at spaced intervals along the bottom of the channel, to provide a space between the bottom of the channel and the glass. The silicone adhesive is spread into the channel, and the glass is then inserted and pressed against the spacers on the base of the channel. This forces the adhesive along the channel and through the holes, and provides for both a snug fit and for curing of the silicone adhesive. The use of an elastic silicone material allows for differences in expansion and contraction between the glass and the channel members which, in this embodiment, are connected to one another.

The side members are not completely assembled with the glass panel until the top and bottom channel members have been placed in position with the glass panel. The top and bottom channel members consist of base portions and flange portions forming a shallow channel preferably one inch deep. Once again, the flanges of the channel recess are within a few-thousandths of the thickness of the glass. A strip of synthetic tape is applied along the glass within the channel, so that the glass fits closely to the channel. The bottom channel member is not adhered to the glass but is merely placed in position embracing the glass. The top channel member is likewise fitted over the glass. However, a resilient material, such as a rubber or isodyne spacer, is placed along the end of the glass to take up expansion differences between the glass and metal channel member. In addition, rubber or cork pads may be used as desired along the base of the bottom channel. The top and bottom channel members are then forced toward one another to place the resilient rubber or isodyne material in compression, and then the side members are placed in position and bolted to the bottom and top members, as by bolts 48.

The means described above which are disposed in the various channels, all coact to help prevent shifting of the glass in the channels, Likewise, they help provide a unitary rigid structure in combination with the glass panel and the channel members. The channel members by themselves would be incapable of functioning as a door, and the thin frame structure without the glass panel, could be easily bent and distorted and would not be rigid as that term is used herein, and in fact, as that term is normally used to describe the doors of buildings. Even if the glass were placed in the channel members without the various means described above, to join the channel members to the glass panel, the aggregation of these parts would not form a unitary rigid structure capable of functioning as a door. It should be apparent, from the dimensions and construction shown in the drawings, that the shallow channels would wobble on the glass, and the glass would not be a structural member lending rigidity to the aggregation of the individual elements. It is only by virtue of all of the elements, that is the channel members, the glass, and the adhesives and resilient means disposed between them, that a rigid unitary structure is formed.

An advantage of this embodiment is that in the most preferred configuration, it provides a better form of support for weather stripping. As shown in the figures, each channel member has an outwardly disposed recess (as at 50, 51) in the end edge away from the glass. Weather stripping 52 is disposed in this recess, and it will be observed that the weather stripping goes completely around the periphery of the door, save for the areas in close proximity to the pivotal support means 55.

Figure 12:
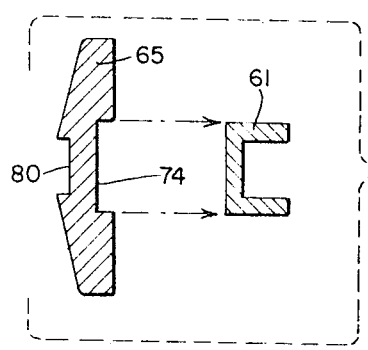
FIG. 12 is an exploded view of the parts in section with the glass and weather stripping removed, taken as indicated by the lines and arrows XII—XII in FIG. 9.

In the further alternate embodiment, shown in FIGS. 9 through 13, the channel members 61, 60, 62, and 63 have additional flange members 64, 65, 66, and 67 added to the respective outer edges thereof. The flange members 64 and 66 are attached by means of a tongue 70, 71, and the recess 72, 73 as in FIGS. 10 and 11. An alternate means of attaching the flanges to the channel members is shown in FIG. 12 wherein flange 65 has a recess 74 therein which is fitted about the outer edge of the channel member 61. These outer flange members stiffen the door against wind and load in usage. The channel members are adhered to the door in a manner similar to that described in the last embodiment. Once again, the flange members may contain an outwardly disposed recess (as at 80, 81, 82) around the periphery of the door, to provide a means for fixing weather stripping 83 to the door.

In all the embodiments, the relatively thin channel members would not by themselves provide a substantially rigid unitary body capable of being hung and swung about pivot points as a door. However, with the addition of the glass panel and a means of adhering the panel to the channel members, the composite door forms a rigid unitary structure which is capable of functioning as a door. The rigidity eliminates the need for the long arm (not shown, but well known in the prior art) which was previously used to coact with the pivotal mounting means, and the frame of the door in order to pivot the door.

It will be understood that various changes in the details, materials and arrangements of parts which have been herein described and illustrated in order to explain the nature of this invention, may be made by those skilled in the art, within the principle and scope of the invention as expressed in the following claims.

It will further be understood that the "Abstract of the Disclosure" set forth above, is intended to provide a non-legal technical statement of the contents of the disclosure in compliance with the Rules of Practice of the United States Patent Office, and is not intended to limit the scope of the invention described and claimed herein.

What is claimed is:

1. A door comprising in combination:
   a. a glass panel;
   b. a plurality of members having channel means formed therein for reception of said glass panel, said plurality of members comprising a top member embracing the top edge of the glass panel and a bottom member embracing the bottom edge of the glass panel, each of said members having
      1. side flanges extending a predetermined distance in overlying relationship to the plane faces of said glass panel, said side flanges being in length a predetermined distance less than the full width of the glass panel and being positioned intermediate the side edges of the glass panel, so that the ends of said flanges are spaced from the side edges of said panel; and
      2. a base having two portions; a first portion extending between the flanges of said member as a web in opposed relationship to the respective end edge of said glass panel about which the member is positioned; and a second portion substantially the same thickness as the glass panel and having at least one face in the same plane as the panel, said second portion extending outwardly from and about the portion of the periphery of the first portion which is not opposed to the end edge of said panel and terminating at both ends of said first portion with portions extending beyond the web in the direction of the extending flanges a predetermined distance less than the extended flange and bearing against the end edge of the glass thereby spacing the web portion from the glass; and
   c. means clamping said glass panel to said members and coacting therewith to form a rigid unitary structure, said means comprising an expanded material in said channel exerting a clamping force between said flanges and said glass panel.

2. A door comprising in combination;
   a. a glass panel;
   b. a plurality of members having channel means formed therein for reception of said glass, said members comprising a top member, a bottom member, a first side member, and a second side member, the channel means of each of said side members being formed by a plurality of flanges depending from a web, said flanges overlying the faces of the glass panel, the width of said channel so formed for receiving said glass being substantially equal to the width of said glass over the greater portion thereof so as to receive said glass in a sliding fit, said side members being connected to said top and bottom members at the respective ends thereof;

c. adhesive means in the channels of said side members contacting and adhering said web to the opposed edge of the glass panel to coact therewith to form in combination a rigid unitary structure, said adhesive means comprising an adhesive requiring exposure to the air in order to cure; and d. a plurality of holes in said webs communicating the channels and the adhesive therein with the atmosphere.

* * * * *

PO-1050
(5/69)

UNITED STATES PATENT OFFICE
CERTIFICATE OF CORRECTION

Patent No. 3,653,156          Dated April 4, 1972

Inventor(s) William J. Horgan, Jr.

It is certified that error appears in the above-identified patent and that said Letters Patent are hereby corrected as shown below:

Column 1 line 42 the figure no. 3 should be -- 4 --.

In column 2 line 32 no. 26a should be -- 27a --.

Signed and sealed this 1st day of August 1972.

(SEAL)
Attest:

EDWARD M. FLETCHER, JR.      ROBERT GOTTSCHALK
Attesting Officer             Commissioner of Patents